United States Patent [19]

Colineau et al.

[11] Patent Number: 4,706,115

[45] Date of Patent: Nov. 10, 1987

[54] GEOMETRY ADJUSTMENT CIRCUIT FOR A COLOR VIDEO PROJECTOR PRODUCING VERTICAL AMPLITUDE, VERTICAL LINEARITY AND HORIZONTAL TRAPEZOID CORRECTION SIGNALS FROM A SINGLE USER-CONTROLLED SIGNAL

[75] Inventors: Joseph Colineau, Seiches sur Loir; Hossein Ahmari, Angers, both of France

[73] Assignee: Societe Electronique de la Region Pays de Loire, Paris, France

[21] Appl. No.: 840,163

[22] Filed: Mar. 17, 1986

[30] Foreign Application Priority Data

Mar. 15, 1985 [FR] France .................... 85 03901

[51] Int. Cl.$^4$ .................... H04N 9/31; H04N 3/233; H04N 9/18; H01J 29/70
[52] U.S. Cl. .................... 358/60; 358/64; 358/237; 315/368
[58] Field of Search .................... 358/56, 60, 64, 65, 358/231, 237, 238, 239; 315/368

[56] References Cited

U.S. PATENT DOCUMENTS 3,943,279 3/1976 Austefjord .................... 358/60
4,395,662 7/1983 Sexton, Jr. .................... 358/60
4,422,019 12/1983 Meyer .................... 315/368
4,422,020 12/1983 Lehnert et al. .................... 358/60

FOREIGN PATENT DOCUMENTS 56590 4/1983 Japan .................... 358/60

OTHER PUBLICATIONS

Darr, J., "Convergence in Basic English", *Radio-Electronics*, Jan. 1966, pp. 46–49.
Robertson, A., "Projection Television", *Wireless World*, Sep. 1976, pp. 47–52.
Elmer, S. J., "A Color Calligraphic CRT Projector for Flight Simulation," *Proceedings of the S.I.D.*, vol. 23, No. 3, 1982, pp. 151–157.

Primary Examiner—James J. Groody
Assistant Examiner—Randall S. Svihla
Attorney, Agent, or Firm—Pollock, VandeSande & Priddy

[57] ABSTRACT

A geometry adjustment device for a color video projector having three monochrome tubes each projecting an image of a given color on a screen, comprising a geometry correction circuit adjustable by the user for providing, by acting on a single signal, vertical amplitude, vertical linearity and horizontal trapezoid corrections of the images projected on the screen by the tubes.

11 Claims, 4 Drawing Figures

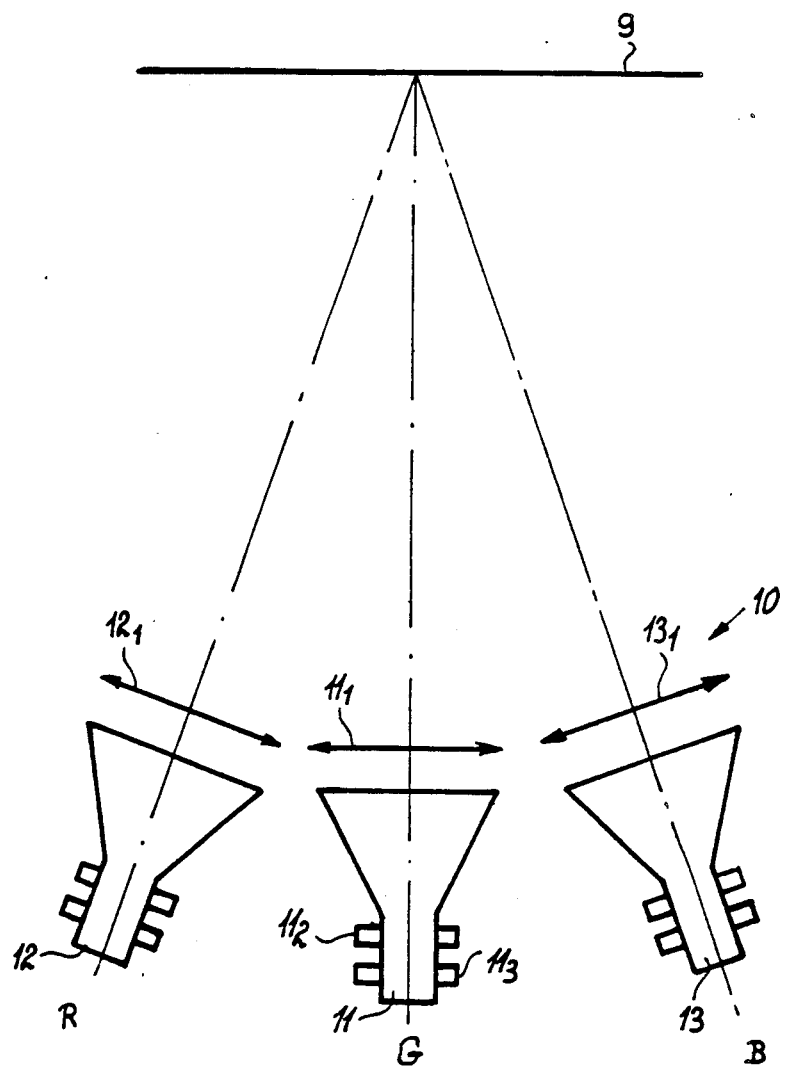
FIG_1
PRIOR ART

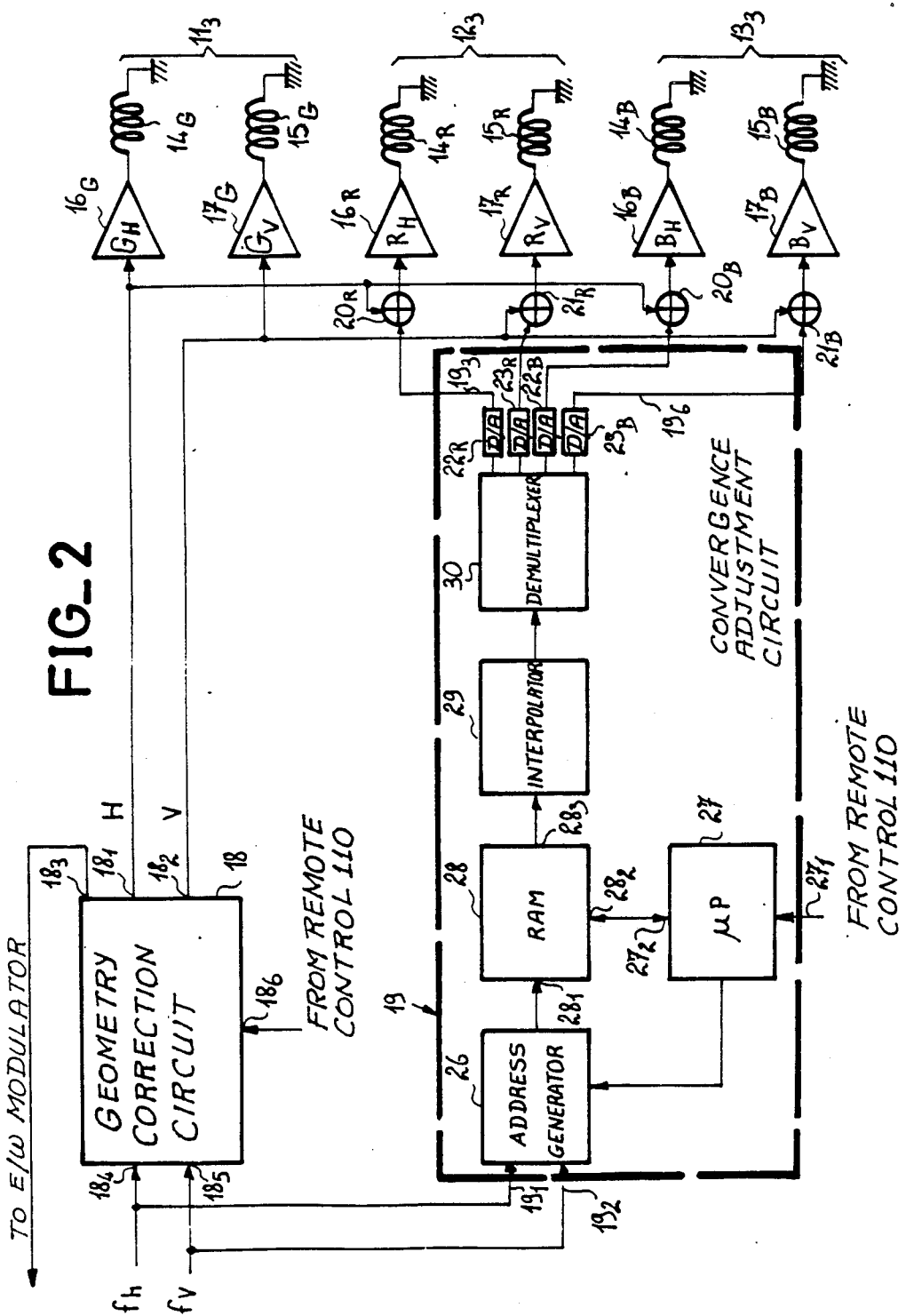
FIG_2

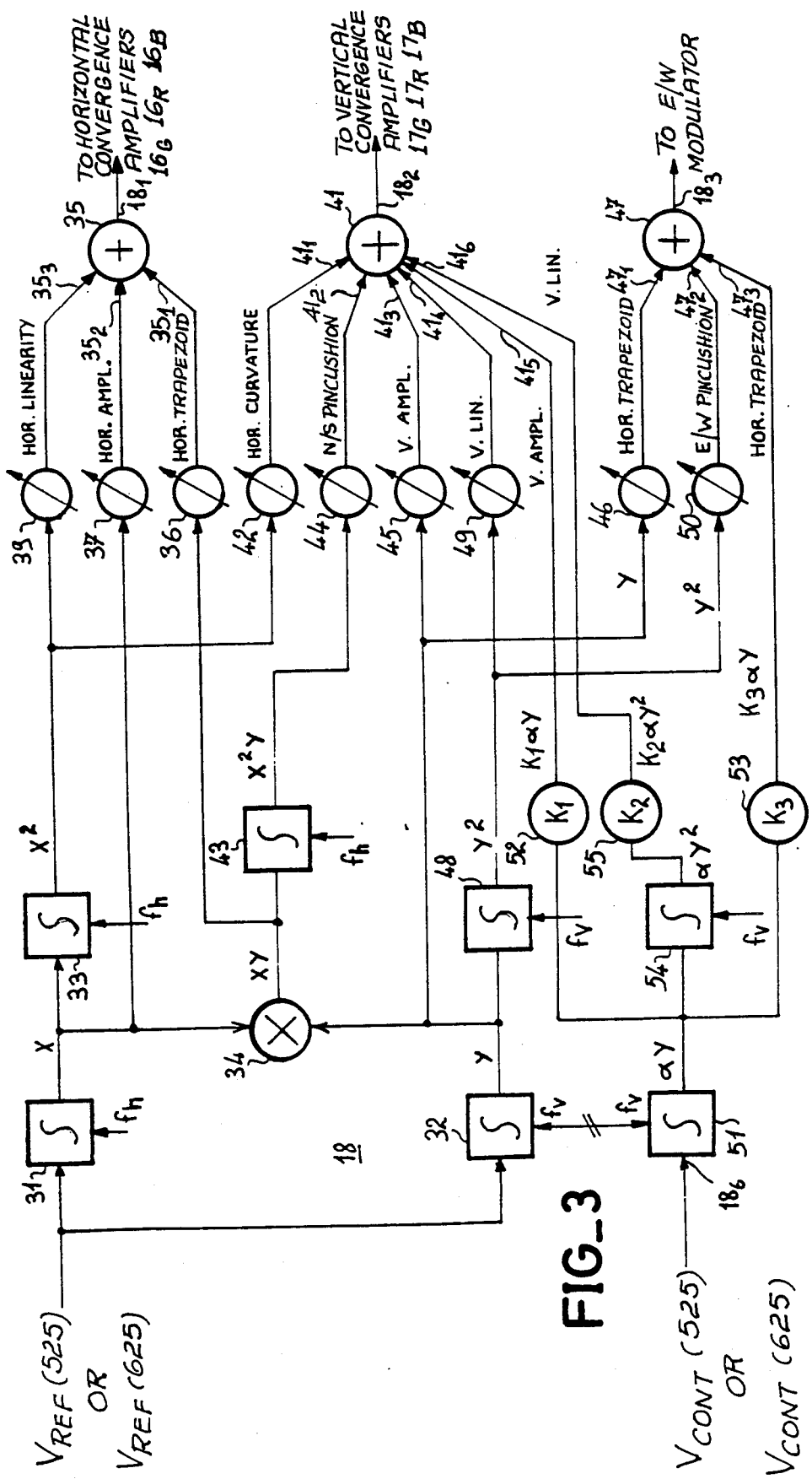
FIG_3

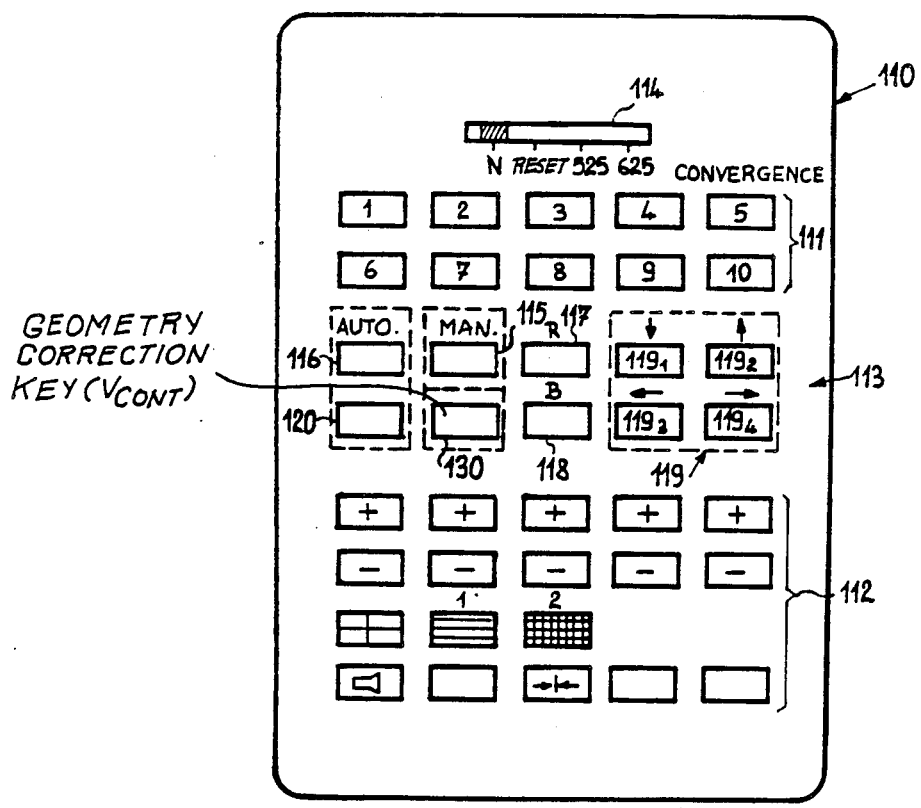
FIG_4

GEOMETRY ADJUSTMENT CIRCUIT FOR A COLOR VIDEO PROJECTOR PRODUCING VERTICAL AMPLITUDE, VERTICAL LINEARITY AND HORIZONTAL TRAPEZOID CORRECTION SIGNALS FROM A SINGLE USER-CONTROLLED SIGNAL

CROSS-REFERENCE TO RELATED APPLICATION

Reference is made to applicant's copending application Ser. No. 840,275, filed Mar. 17, 1986.

BACKGROUND OF THE INVENTION

The invention relates to a convergence and geometry adjustment device for a video-projector comprising several cathode ray tubes.

A video-projector is a television receiver projecting images on a screen of a larger size than the usual screens of cathode ray tubes. The most widely used type comprises three cathode ray tubes, one for each fundamental color and, for each of these tubes, a lens for projecting on a screen.

A video-projector usually comprises geometry correction circuits acting on the scanning of the three tubes for correcting the usual deformations of the television image such as north-south pincushion and east-west pincushion, as well as deformation specific to the video-projector, which are due to the variable slant of the axes of the tube with respect to a perpendicular to the screen. In fact, the most usual case is a vertical screen and tubes whose axes are not in a horizontal plane, but in a plane slanting upwards in the projection direction; the shape of the projection surface also forms a possible cause of geometric deformation of the image.

These defects of geometry are corrected by acting on the horizontal and vertical deflection fields using geometry correction circuits. Some geometry corrections are independent of the orientation of the tubes with respect to the screen or of the shape thereof; they are generally provided by the manufacturer. Other connections are made by the user (or the installer): these corrections are for horizontal trapezoid, vertical linearity and vertical amplitude faults. A vertical amplitude fault is a deviation of the height of the image with respect to the normal; a vertical linearity fault is the non-conservation of distances in vertical direction and a horizontal trapezoid fault is a deformation of the image which, instead of being rectangular, has the form of a trapezoid with parallel horizontal edges. These corrections may be made by adjusting the position of the screen with respect to that of the video-projector. This operation is relatively difficult to carry out. This is why these corrections are often made by correcting or modifying the scanning action; in known devices, three adjustments are provided on the apparatus: the first for the amplitude, the second for the linearity and the third for the trapezoid defect. These adjustments are also difficult to use.

The invention overcomes this drawback.

SUMMARY OF THE INVENTION

The adjustment device of the invention comprises a circuit for a geometry adjustment to be made by the user; a single parameter (a single adjustment) is sufficient to correct for horizontal trapezoid, vertical linearity and vertical amplitude defects. The adjustment means is preferably provided on a remote control box.

In one embodiment, each of the three tubes includes an auxiliary coil to which the geometry correction signals are applied, whether the corrections are implemented by the manufacturer or by the user.

In one example, an integrator is provided integrating a frame frequency signal whose initial value (which forms said single parameter) is adjustable by the user. The output signal of the integrator is used for making the vertical amplitude and horizontal trapezoid corrections, as well as for driving a second integrator whose output is used for controlling vertical linearity corrections.

Furthermore, the images produced by the three tubes must be perfectly superimposed on the screen. This result is practically impossible to attain by simple adjustment of the orientation of the tubes and of the projection lenses. The reasons for this impossibility are diverse: the dispersion, inherent in large scale manufacture, of the image shapes produced by each of the tubes; the lenses, usually made from a plastic material, which for reasons of economy do not have chromatic corrections and which therefore do not have the same index of refraction for the three fundamental colors; the axes of the three tubes cannot all be perpendicular to the projection screen: in general, the axis of the tube projecting the green image is as a rule perpendicular to the screen and the axes of the tubes projecting the red and blue images are slanted in opposite directions with respect to this perpendicular; thus the green image may be rectangular whereas the red and blue images have a trapezoid shape with vertical parallel edges.

This is why a video-projector includes a circuit for correcting or adjusting for convergence. The convergence correction generates currents feeding coils affecting the horizontal and vertical deflections of the electron beam of two of the tubes, generally the red and blue, for shaping the corresponding images so that on the screen they are superimposed on the image projected by the first tube, namely the green. This correction is made either directly on the currents of the line deflection (horizontal) and frame deflection (vertical) coils through active elements and modulators, or by means of auxiliary deflectors, preferably the same as those used for the geometry corrections.

BRIEF DESCRIPTION OF THE DRAWINGS

Other features and advantages of the invention will be clear from the description of some of its embodiments, this description referring to the accompanying drawings in which:

FIG. 1 is a simplified diagram of a three tube video-projector,

FIG. 2 is a general diagram of a circuit in accordance with the invention,

FIG. 3 is a more detailed diagram, and

FIG. 4 is a diagram of the remote control box forming part of the device of the invention.

DESCRIPTION OF THE PREFERRED EMBODIMENT

In the example, the video-projector 10 comprises three monochrome tubes 11, 12 and 13 projecting images of colors respectively green G, red R and blue B on a screen 9 through lenses, respectively $11_1$, $12_1$ and $13_1$.

Each tube includes main deflectors providing the horizontal and vertical deflections of the electron beam produced by the electron gun and a pair of auxiliary deflectors also acting on the electron beam for providing the geometry and convergence corrections. In FIG. 1, for the green tube 11, the pair of main deflectors bears the reference $11_2$ and the auxiliary pair of deflectors has the reference $11_3$.

Each pair of deflectors is formed of two coils, one for the horizontal deflection 14 and the other for the vertical deflection 15. In FIG. 2, the reference numbers of these coils have an index added thereto corresponding to the color of the corresponding tube, G for green, R for red and B for blue. Each coil is fed with an electric current by a convergence amplifier, referenced 16 for the horizontal deflection and referenced 17 for the vertical deflection. Each amplifier 16, 17 delivers at its output a current whose intensity is proportional to the voltage at its input. Deflection of the spot on the screen with respect to its nominal position is proportional to the intensity of the current flowing through the deflector.

In FIG. 2 there have been shown, on the one hand, the geometry correction circuit 18 and, on the other hand, a convergence adjustment circuit 19. The geometry correction circuit 18 has two outputs $18_1$ and $18_2$ supplying the inputs of all the horizontal and vertical convergence amplifiers, and a third output $18_3$ controlling an east-west modulator (not shown) associated with the main deflectors. As will be seen hereafter in connection with FIG. 3, this circuit 18 has two inputs $18_4$ and $18_5$ receiving frequencies at the respectively horizontal (or line) $f_h$ and vertical (or frame) $f_v$ scanning frequencies.

The geometry correction circuit 18 supplies a pair of convergence amplifiers 16 and 17 for each of the green (G), red (R) and blue (B) tubes. On the other hand, the convergence correction circuit 19 only supplies two pairs of convergence amplifiers, those which are associated with the red tube 12 (R) and with the blue tube 13 (B). For simultaneously supplying these convergence amplifiers $16_R$, $16_B$, $17_R$, $17_B$ by the circuits 18 and 19, adders $20_R$, $21_R$, $20_B$, $21_B$ is provided.

Circuit 19 has two inputs $19_1$ and $19_2$ receiving signals at the line $f_h$ and frame $f_v$ scanning frequencies. Circuit 19 has four outputs $19_3$ to $19_6$, supplying the corresponding inputs of the adders $20_R$, $21_R$, $20_B$, $21_B$ via digital-analog converters $22_R$, $23_R$, $22_B$, $23_B$.

The convergence adjustment circuit 19, the purpose of which is to superimpose the red and blue images on the green image, is based on the division of the screen into 208 zones: 16 zones in the horizontal direction and 13 zones in the vertical direction including an initialization zone corresponding to the frame suppression interval.

Each of the zones is associated with four correction values, corresponding to the four signals at the outputs $19_3$ to $19_6$.

The division into zones is provided by means of an address generator 26 which receives input signals at frequencies $f_h$ and $f_v$. In order to allow modification of the sequence of the address signals in the case of a change of standard, a microprocessor 27, also forming part of circuit 19, is included. The microprocessor has an input $27_1$ receiving signals from a remote control box 110 (FIG. 4). The microprocessor 27 is also used to calculate correction signals.

These correction signals are stored in a RAM 28 having a capacity of 2 K bytes with an input $28_1$ connected to the output of the address generator 26 and an input-output $28_2$ connected to an input-output $27_2$ of microprocessor 27. Associated with RAM 28 is a battery (not shown) for safeguarding its contents when the circuit is disconnected from its electric power supply.

The output $28_3$ of memory 28 is connected to the input of an interpolator 29, the purpose of which is to smooth the correction values from one vertical zone to another (in the same column). The output signals of this interpolator 29 are in series, like the signals from memory 28; they are fed to a demultiplexer 30 connected to the four outputs $19_3$ to $19_6$ by the digital-analog converters $22_R$, $22_B$, $23_R$ and $23_B$. The microprocessor 27 is used during a convergence adjustment phase for modifying the contents of memory 28 as a function of orders issued by the user. The microprocessor 27 is also used for automatically transforming the correction values stored in the memory 28 during a change of video standard, without the user having to intervene, for example when going from the SECAM standard to the NTSC standard. In other words, it is not necessary to make a new adjustment when changing video standards.

The geometry correction circuit 18 (FIG. 3) generates a first set of signals (which are fixed and cannot be modified by the user) for making the conventional corrections to geometric defects intrinsic in television scanning. This circuit 18 also generates a second set of signals which are adjustable by the user by means of the remote controls acting through key 130 (FIG. 4) on the input $18_6$. These adjustments, accessible to the user, are those by which the non-perpendicularity to screen 9 of the three light beams projected by lenses $11_1$, $12_1$ and $13_1$ are compensated. These adjustments affect first of all the vertical amplitude, that is to say, they modify the height of the image. They also affect the vertical linearity, that is to say, they allow the distances in the vertical direction to be re-established. Finally the user may also make the "horizontal trapezoid" adjustment for modifying the length of the lines so as to re-establish a rectangular shape of the image.

The adjustments not accessible to the user also comprise vertical amplitude, vertical linearity and horizontal trapezoid adjustments. Furthermore, horizontal linearity, horizontal amplitude, horizontal curvature, north-south pincushion and east-west pincushion corrections are provided.

For making geometry corrections which are not adjustable by the user, so called first set or "fixed" corrections, a reference voltage $V_{ref}$ is integrated with the line frequency $f_h$ and with the frame frequency $f_v$ so as to form signals proportional to x, to $x^2$, to y, to $y^2$, to xy and to $x^2y$, x and y being the coordinates, respectively horizontal and vertical, of the spot on the screen.

For corrections accessible to the user, called second set or "variable" corrections, a control voltage $V_{cont}$, whose value is adjustable by the user with the remote control box 11, is integrated with the frame frequency so as to form signals proportional to y and $y^2$.

The signal $V_{ref}$ is applied to the input of the first integrator 31 which integrator is reset at the line frequency $f_h$ and $V_{ref}$ is also applied to the input of an integrator 32 which is reset to the frame frequency $f_v$. At the output of the integrator 31, a signal x is obtained which is applied to the input of a second integrator 33 also driven at the frequency $f_h$ and thus delivering at its output a signal $x^2$.

The output of integrator 31 is connected to a first input of a multiplier 34 whose second input receives the output signal from the integrator 32 namely the signal y. Thus, the output of multiplier 34 delivers a signal xy which is applied to an input $35_1$ of an adder 35 through a horizontal trapezoid adjustment potentiometer 36.

The output signal from integrator 31 is also applied to a second input $35_2$ of adder 35 through another potentiometer 37 for adjusting the horizontal amplitude. The adder 35 includes a third input $35_3$ receiving the output signal $x^2$ from integrator 33 with a coefficient which depends on the setting of a horizontal linearity potentiometer 39. The output from adder 35 forms the horizontal correction output $18_1$ of generator 18.

The output signal $x^2$ from the integrator 33 is also applied to the first input $41_1$ of another adder 41 through a potentiometer 42 for adjusting the horizontal curvature. The output of adder 41 forms the vertical correction output $18_2$ of generator 18.

The output xy from multiplier 34 is applied to the input of another integrator 43 driven at the line frequency $f_h$ and thus delivering at its output a signal $x^2y$ which is applied through a potentiometer 44 to a second input $41_2$ of adder 41. The signal at input $41_2$ effects the north-south pincushion correction.

The output from integrator 32 which delivers a signal y is fed to the third input $41_3$ of adder 41 through a potentiometer 45 for adjusting the vertical amplitude. The output signal from integrator 32 is also applied, through a potentiometer 46, to the first input $47_1$ of an adder 47 whose output forms the output $18_3$ of circuit 18 which is connected to an east-west modulator, that is to say to a circuit providing multiplication by x. The signal applied to input $47_1$ effects a horizontal trapezoid correction.

The output signal y from integrator 32 is applied to the input of another integrator 48 driven at the frame scan frequency and thus delivering at its output a signal $y^2$ which is applied, through a potentiometer 49, to a fourth input $41_4$ of adder 41. The signal at input $41_4$ contributes to the vertical linearity correction. The signal $y^2$ is also applied to the second input $47_2$ of adder 47 through another potentiometer 50 for effecting the east-west pincushion correction.

The control voltage $V_{cont}$ which is adjustable by the user by means of the remote control (key 130, FIG. 4) is applied to the input of an integrator 51 driven at the vertical frequency $f_v$ and thus delivery at its output a signal proportional to y, namely $\alpha y$. This signal $\alpha y$ is fed to the fifth input $41_5$ of adder 41 via a resistor 52 (or several resistors) multiplying the signal by a coefficient $K_1$. The signal $K_1 \alpha y$ at input $41_5$ allows the vertical amplitude correction to be made.

The output signal $\alpha y$ from integrator 51 is applied, through one (or more) resistor(s) 53 multiplying the signal by coefficient $K_3$, to the third input $47_3$ of adder 47. The signal at $47_3$ contributes to the horizontal trapezoid correction.

The signal $\alpha y$ is supplied to the input of an integrator 54 driven at the vertical scan frequency and thus delivering at its output a signal $\alpha y^2$ which is fed to a sixth input $41_6$ of adder 41 through one (or more) resistor(s) 55 multiplying the output signal by coefficient $K_2$. The signal $K_2 \alpha Y^2$ applied to input $41_6$ allows the vertical linearity correction to be made.

It should be noted that the east-west modulator, which receives the output signals from adder 47 and forms part of the basic circuit of the video projector makes the greatest amplitude correction, which is particularly useful for the horizontal trapezoid correction. That correction is the most important correction to be made.

Finally, the reference voltage of the vertical frequency integrators 32, 48, 51, and 54 is adjustable, under the control of microprocessor 27, during a change of video standard. It should also be noted that the reference voltage of analog to digital converters $22_R$, $22_B$, $23_R$ and $23_B$ is also adjustable and for the same reason.

For controlling the video-projector and making adjustments, the user has a remote control box 110 (FIG. 4). The remote control 110 includes conventional keys 111 for stored channel numbers and 112 for sound volume, brightness, color intensity adjustment and for station tuning and tuning frequency. The remote control further includes an assembly 113 of keys for the geometry (key 130) and convergence corrections (keys 115–118, 120 and $119_1$, $119_2$, $119_3$ and $119_4$), as well as a switch 114 which, depending on its position, allows the remote control box 110 to be used either in normal mode N for controlling the functions of the video-projector, that is to say for the use of keys 111 and 112 or in the adjustment mode indicated by the "convergence" positions in FIG. 4 with two positions corresponding to the 525 and 625 video standards. Furthermore, a reset position is provided for resetting the contents of memory 28 or returning them to an initial state.

It should be noted that the convergence and adjustment circuit of the invention may be used not only for adjustment by the user but also during manufacture for quality control.

Usually the DC voltages supplying the different electronic components are produced from the VHT supply. This supplies the single reference voltage used for the digital-analog converter $22_R$, $22_B$, $23_R$ and $23_B$. It is important for this reference voltage to remain constant or to keep a value so as to always produce the same effect on the electron beam. Now, when the power supplied by the VHT increases, the acceleration voltage of the electron beam decreases and the efficiency of the convergence deflectors becomes greater, which modifies the adjustment. To overcome this disadvantage, a regulation circuit is provided which reduces the reference voltage of the digital-analog converters when the VHT power increases.

So as to avoid an error in using the remote control box 110 after the adjustments have been made, a switch is provided on the case which, when it is in a given position, inhibits the action of keys 113.

What is claimed is:

1. A geometry adjustment device for a color video projector comprising three monochrome tubes each projecting an image of a given color on a screen, said geometry adjustment device comprising:
    a user-controlled device,
    geometry adjustment circuit means responsive to said user-controlled device for modifying a single signal to produce vertical amplitude, vertical linearity and horizontal trapezoid corrections of said images projected on said screen by said tubes.

2. A device as recited in claim 1 wherein said tubes include auxiliary correction coils, and wherein
    said geometry adjustment circuit means includes first means for producing vertical amplitude and vertical linearity correction signals, and means for applying said vertical amplitude and vertical linearity correction signals to said auxiliary correction coils.

3. A device as recited in claim 2 wherein said first means includes:
first integrator means for integrating the value of said single signal with a frame frequency signal for use in generating said vertical amplitude correction signal, and
second integrator means responsive to an output of said first integrator means for producing said vertical linearity correction signal.

4. A device as recited in any of claims 1, 2 or 3 in which said user-controlled device is coupled to said geometry adjustment circuit means by an infrared communication link and wherein said user-controlled device includes television operation keys and a geometry correction key for modifying the value of said single signal.

5. A device as recited in claim 3 wherein said first and second integrator means each include an integrator and wherein said user-controlled device includes a video standard switch for selecting one of at least two different video standards, a reference voltage of said integrators being adjusted in accordance with the video standard selected.

6. A device as recited in claim 2 wherein said geometry adjustment circuit means further includes convergence correction circuit means for applying convergence correction signals to said auxiliary correction coils of at least two of said tubes.

7. A device as recited in claim 2 wherein said geometry adjustment circuit means produces said correction signals in response to said single signal.

8. A device as recited in claim 1 wherein said geometry adjustment circuit means includes first means for producing a horizontal trapezoid correction signal and means for applying said horizontal trapezoid correction signal to an east-west modulator.

9. A device as recited in claim 8 wherein said first means includes integrator means for generating said horizontal trapezoid correction signal.

10. A device as recited in claim 1 wherein said color video projector further comprises an east-west modulator, wherein said tubes include at least vertical auxiliary correction coils, and wherein
said geometry adjustment circuit means includes:
first means for producing vertical amplitude, vertical linearity and horizontal trapezoid correction signals,
means for applying said vertical amplitude and vertical linearity correction signals to said vertical auxiliary correction coils, and means for applying said horizontal trapezoid correction signal to said east-west modulator.

11. A device as recited in claim 10 wherein said first means includes:
first integrator means for integrating the value of said single signal with a frame frequency signal for use in generating said vertical amplitude and horizontal trapezoid correction signals, and
second integrator means responsive to an output of said first integrator means for producing said vertical linearity correction signal.

* * * * *